(12) United States Patent
Arakawa et al.

(10) Patent No.: US 11,556,003 B2
(45) Date of Patent: Jan. 17, 2023

(54) CLEANING APPARATUS AND CONTROL METHOD FOR CLEANING APPARATUS

(71) Applicant: CANON KABUSHIKI KAISHA, Tokyo (JP)

(72) Inventors: Seiichi Arakawa, Kamakura (JP); Gou Yamashita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 635 days.

(21) Appl. No.: 16/523,915

(22) Filed: Jul. 26, 2019

(65) Prior Publication Data

US 2020/0033594 A1 Jan. 30, 2020

(30) Foreign Application Priority Data

Jul. 30, 2018 (JP) .............................. JP2018-142901
Jul. 12, 2019 (JP) .............................. JP2019-130281

(51) Int. Cl.
*G02B 27/00* (2006.01)
*B08B 5/02* (2006.01)
*B08B 1/04* (2006.01)

(52) U.S. Cl.
CPC ............ *G02B 27/0006* (2013.01); *B08B 1/04* (2013.01); *B08B 5/02* (2013.01)

(58) Field of Classification Search
CPC ......... G02B 27/0006; B08B 1/04; B08B 5/02; B08B 1/006; B08B 13/00; G03B 17/56
See application file for complete search history.

(56) References Cited

U.S. PATENT DOCUMENTS

| 2007/0247607 | A1 | 10/2007 | Shibazaki |
| 2017/0043442 | A1* | 2/2017 | Takikawa ................ B05B 15/60 |
| 2017/0072421 | A1* | 3/2017 | Baumann .................. B08B 3/02 |

FOREIGN PATENT DOCUMENTS

| CN | 102181844 | A | | 9/2011 |
| CN | 204620489 | U | | 9/2015 |
| CN | 105744874 | A | | 7/2016 |
| CN | 106019557 | A | | 10/2016 |
| JP | H10-062915 | A | | 3/1998 |
| JP | 2001-075241 | A | | 3/2001 |
| JP | 2001075241 | A | * | 3/2001 |
| JP | 2005-024905 | A | | 1/2005 |
| JP | 4537105 | B2 | | 9/2010 |

OTHER PUBLICATIONS

Machine translation of JP 2001075241 (Year: 2001).*

* cited by examiner

*Primary Examiner* — Erin F Bergner
(74) *Attorney, Agent, or Firm* — Canon U.S.A., Inc. IP Division

(57) ABSTRACT

A cleaning apparatus that cleans a detection surface of a detection element includes a first cleaning member, a second cleaning member, a driving device, to which the first cleaning member and the second cleaning member are attached, configured to drive the first and second cleaning members to approach and recede from the detection surface, and a control unit configured to control the first and second cleaning members and the driving device.

14 Claims, 9 Drawing Sheets

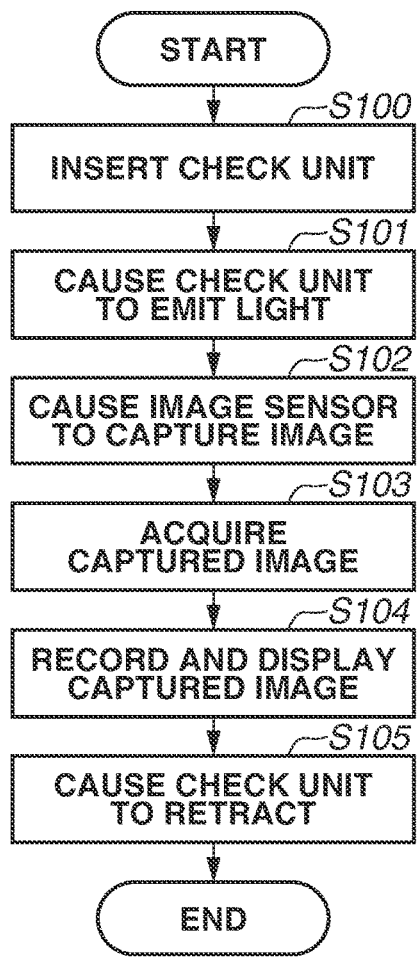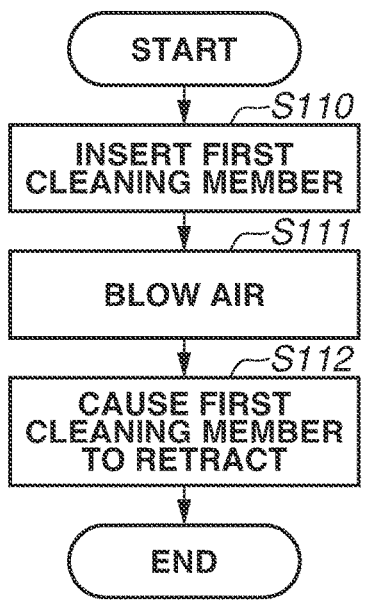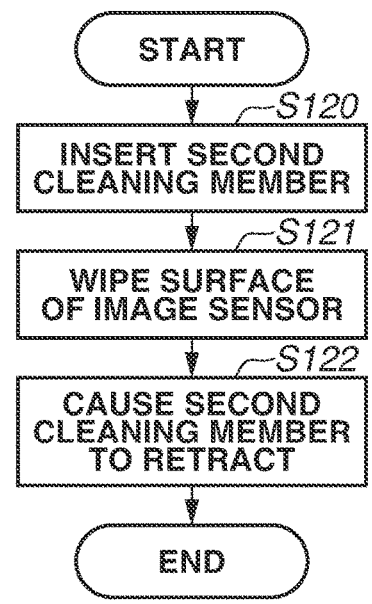

CLEANING APPARATUS AND CONTROL METHOD FOR CLEANING APPARATUS

BACKGROUND OF THE INVENTION

Field of the Invention

The present invention relates to a cleaning apparatus that cleans a detection surface of a detection element that detects a physical quantity of light, electromagnetic waves, or the like, and to a cleaning method for the cleaning apparatus.

Description of the Related Art

There is an issue with such detection elements that erroneous detection can occur due to foreign particles adhering to the detection surface of a detection element. In a digital camera including an image sensor having a configuration in which photoelectric converters serving as light-receiving elements are arranged side by side, an image capturing surface of the image sensor is periodically cleaned to thereby prevent a deterioration in the quality of an image to be obtained. However, there is a possibility that the image capturing surface may be accidentally damaged by a user when the user cleans the image capturing surface by himself/herself. Conventionally, it has been a common practice for a user to take an image sensor to a service store run by a manufacturer or the like and have a trained operator clean the image capturing surface of the image sensor. However, the accuracy of cleaning work varies according to the difference in the proficiency level among dedicated operators. In this regard, Japanese Patent No. 04537105 discusses an apparatus that is connected to a camera so as to clean the front surface of an image capturing surface by wiping the surface using wind pressure or an adhesive sheet.

SUMMARY OF THE INVENTION

According to an aspect of the present invention, a cleaning apparatus that cleans a detection surface of a detection element includes a first cleaning member including a first cleaning portion configured to perform cleaning, the first cleaning member being configured to clean the detection surface by using the first cleaning portion, a second cleaning member including a second cleaning portion of a type different from the first cleaning portion, and configured to clean the detection surface by using the second cleaning portion, a driving device, to which the first cleaning member and the second cleaning member are attached, configured to drive the first cleaning member and the second cleaning member to approach or recede from the detection surface, and a control unit configured to control each of the first cleaning member, the second cleaning member, and the driving device. The control unit is configured to control the first cleaning member and the second cleaning member to clean the detection surface by controlling the driving device to cause one of the first cleaning portion and the second cleaning portion to approach the detection surface relatively to the other one of the first cleaning portion and the second cleaning portion, controlling cleaning of the detection surface to be performed using the one of the first cleaning portion and the second cleaning portion that has been caused to approach the detection surface, and controlling the one of the first cleaning portion and the second cleaning portion that has been caused to approach the detection surface to recede from the detection surface after the cleaning.

According to another aspect of the present invention, a control method for a cleaning apparatus that cleans a detection surface of a detection element, the cleaning apparatus including a first cleaning member including a first cleaning portion configured to perform cleaning, the first cleaning member being configured to clean the detection surface by use of the first cleaning portion, a second cleaning member including a second cleaning portion of a type different from the first cleaning portion, the second cleaning member being configured to clean the detection surface by use of the second cleaning portion, and a driving device, to which the first cleaning member and the second cleaning member are attached, configured to drive the first cleaning member and the second cleaning member to approach or recede from the detection surface, the control method including controlling the driving device to cause one of the first cleaning member and the second cleaning member to approach the detection surface relatively to the other one of the first cleaning member and the second cleaning member, cleaning the detection surface by use of one of the first cleaning member and the second cleaning member that has been caused to approach the detection surface, and controlling, after the cleaning of the detection surface, one of the first cleaning member and the second cleaning member that has been caused to approach the detection surface to recede from the detection surface.

Further features of the present invention will become apparent from the following description of exemplary embodiments with reference to the attached drawings. Each of the embodiments of the present invention described below can be implemented solely or as a combination of a plurality of the embodiments. Also, features from different embodiments can be combined where necessary or where the combination of elements or features from individual embodiments in a single embodiment is beneficial.

BRIEF DESCRIPTION OF THE DRAWINGS

FIGS. 4A, 4B, and 4C are flowcharts illustrating each sequence of the cleaning apparatus according to the exemplary embodiment.

DESCRIPTION OF THE EMBODIMENTS

Figure 1A:
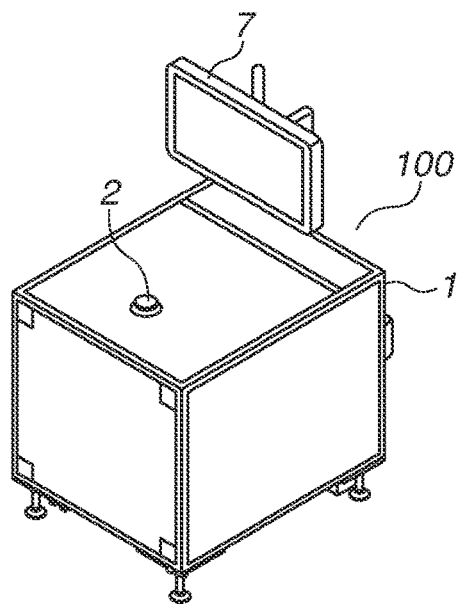
FIGS. 1A, 1B, and 1C are external perspective views each illustrating a cleaning apparatus according to an exemplary embodiment of the present invention.

Japanese Patent No. 04537105 does not sufficiently discuss a configuration of a cleaning apparatus and a control method thereof to remove foreign parties of various types adhering to a detection surface. The issue that foreign particles adhering to the detection surface need to be removed is inherent not only in image sensors, but also in general detection elements including a detection surface for detecting a physical quantity, and thus there is similarly a long felt demand for such a cleaning apparatus for use in the cleaning of other detection elements. Accordingly, the present invention is directed to providing a cleaning apparatus that removes various types of foreign particles adhering to a detection surface of a detection element, and to a control method for the cleaning apparatus.

A first exemplary embodiment of the present invention will be described in detail below with reference to the accompanying drawings. Throughout the drawings, like or corresponding parts are denoted by the same reference numerals.

Figure 1B:
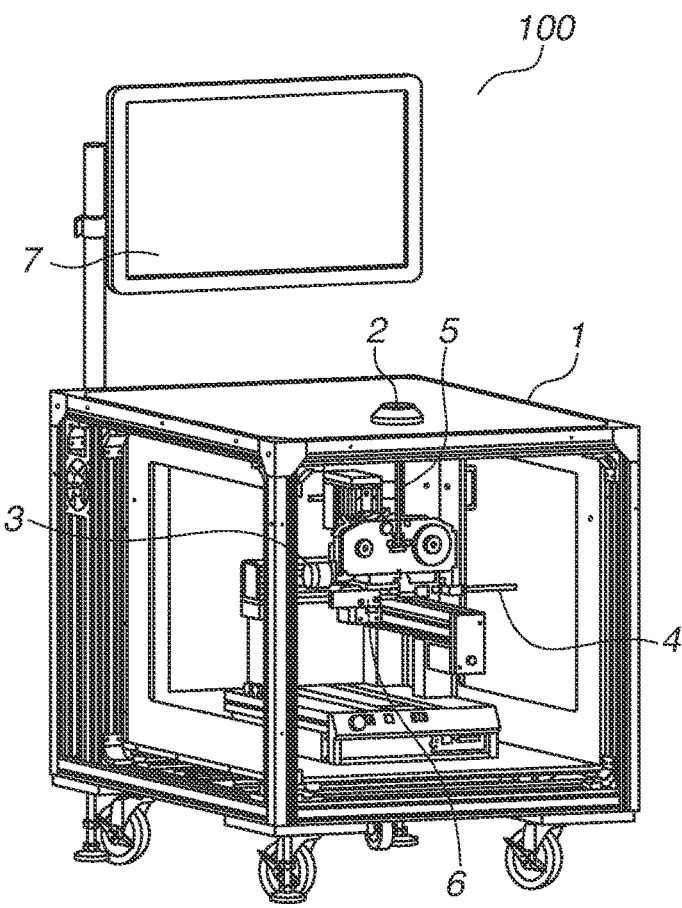
Figure 1C:
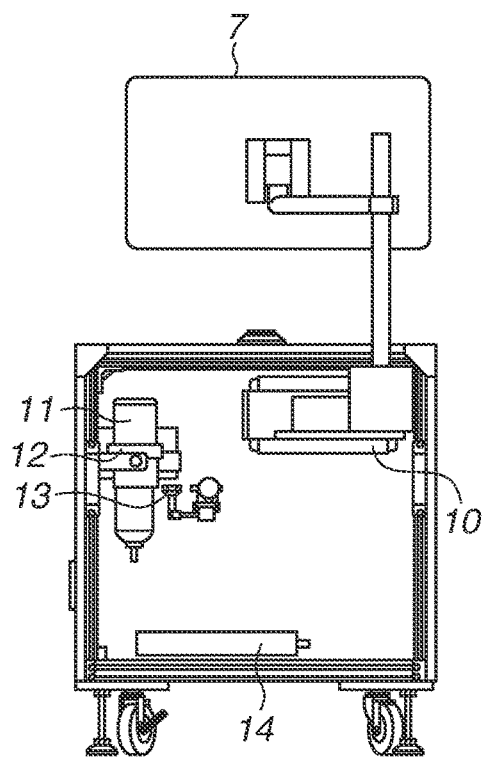

FIGS. 1A to 1C each illustrate a cleaning apparatus 100 as an example of a cleaning apparatus according to an exemplary embodiment of the present invention. In the present exemplary embodiment, a description is given of a cleaning apparatus, as an example, for cleaning an image capturing surface of an image sensor which is included in a digital camera and is composed of a complementary metal-oxide semiconductor (CMOS) sensor or the like.

FIG. 1A illustrates an external view of the cleaning apparatus 100. The cleaning apparatus 100 includes a main body 1 formed of a metal chassis, a fixing unit 2 that fixes a detection apparatus (a camera in the present exemplary embodiment) to be cleaned, and a display unit 7 that displays various types of information. The display unit 7 may be configured as a separate body that can communicate with the cleaning apparatus 100.

FIG. 1B illustrates an internal configuration of the cleaning apparatus 100. A movable pedestal 6 is integrally provided with a check unit 3, a first cleaning member 4, and a second cleaning member 5. The movable pedestal 6 is translated and rotated in a three-dimensional direction, thereby making it possible to change the position of each unit, as needed. In particular, the movable pedestal 6 includes a translation mechanism that enables the movable pedestal 6 to be translated in a vertical direction so that each unit can approach to the position of the fixing unit 2, i.e., to an image sensor surface (detection surface) after a camera 200 is attached to the fixing unit 2, and can retract toward the cleaning apparatus 100.

The fixing unit 2 is composed of a ring-shaped metal member arranged on an exterior surface of the main body 1. In the present exemplary embodiment, the fixing unit 2 is configured such that, when the camera 200 to be cleaned is fixed to the fixing unit 2, a camera mount where an interchangeable lens is attached to and detached from during normal use can be attached and fixed to the fixing unit 2. The fixing unit 2 also includes an electrical connection terminal by which the fixing unit 2 can communicate with the camera 200 to be attached. Further, the fixing unit 2 includes a ring-shaped illumination for ensuring the amount of light during monitoring of a state of cleaning performed by cleaning apparatus 100, and irradiates the detection element to be cleaned (image sensor of the camera 200) with light during cleaning of the detection element by the first cleaning member 4 and the second cleaning member 5. In particular, an appropriate shape (mechanism) of a connection part of the fixing unit 2 varies according to the type of an external apparatus to be attached. Accordingly, the fixing unit 2 may be configured to be detachably attached to the main body 1, and the fixing unit 2 may be changed according to an external apparatus to be connected. Alternatively, a number of fixing units 2 corresponding to the number of types of external apparatuses that are assumed to be connected may be provided. The fixing unit 2 may be provided as a general-purpose fixing mechanism capable of fixing the camera 200, regardless of the apparatus type.

In the present exemplary embodiment, a connection terminal on the camera mount of the camera 200 to be attached is used to detect an attachment of the camera 200. Specifically, when the connection terminal of the fixing unit 2 is electrically connected to the connection terminal of the camera mount, the attachment of the camera 200 to the cleaning apparatus 100 is detected.

The first cleaning member 4 is a cleaning instrument for performing non-contact cleaning on the surface of the detection element. In the present exemplary embodiment, air is blown to blow off foreign particles by wind pressure.

The second cleaning member 5 is a cleaning instrument for performing contact cleaning on the surface of the detection element. In the present exemplary embodiment, foreign particles are cleaned by wiping them off from the surface using a wiping tool.

FIG. 1C illustrates a rear side view illustrating an internal configuration of the cleaning apparatus 100. In general, a cover is attached to an external case so as to cover each unit mounted on an internal case. A control unit 10 is composed of a computer including a central processing unit (CPU). The control unit 10 controls the overall operation of the cleaning apparatus 100. The control unit 10 processes information from each unit, and instructs each unit to execute processing.

An air filter 11 reduces foreign particles or oil present in the air when the air used for the first cleaning member 4 is injected from an external pump through an intake port 12. The air which has passed through the air filter 11 is supplied to the first cleaning member 4. If the air filter 11 is omitted, there is a possibility that foreign particles included in the air may be blown toward the detection surface of the detection element. A pressure gauge 13 measures and displays the pressure of the air to be injected. A user can adjust the pressure to an appropriate pressure, as needed, based on the pressure indicated by the pressure gauge 13.

A power supply 14 supplies the entire cleaning apparatus 100 with power. The power supply 14 may also include a function of feeding power to an external apparatus via an interface (the electrical connection terminal of the fixing unit 2, a communication unit 17, or the like in the present exemplary embodiment).

Figure 2:
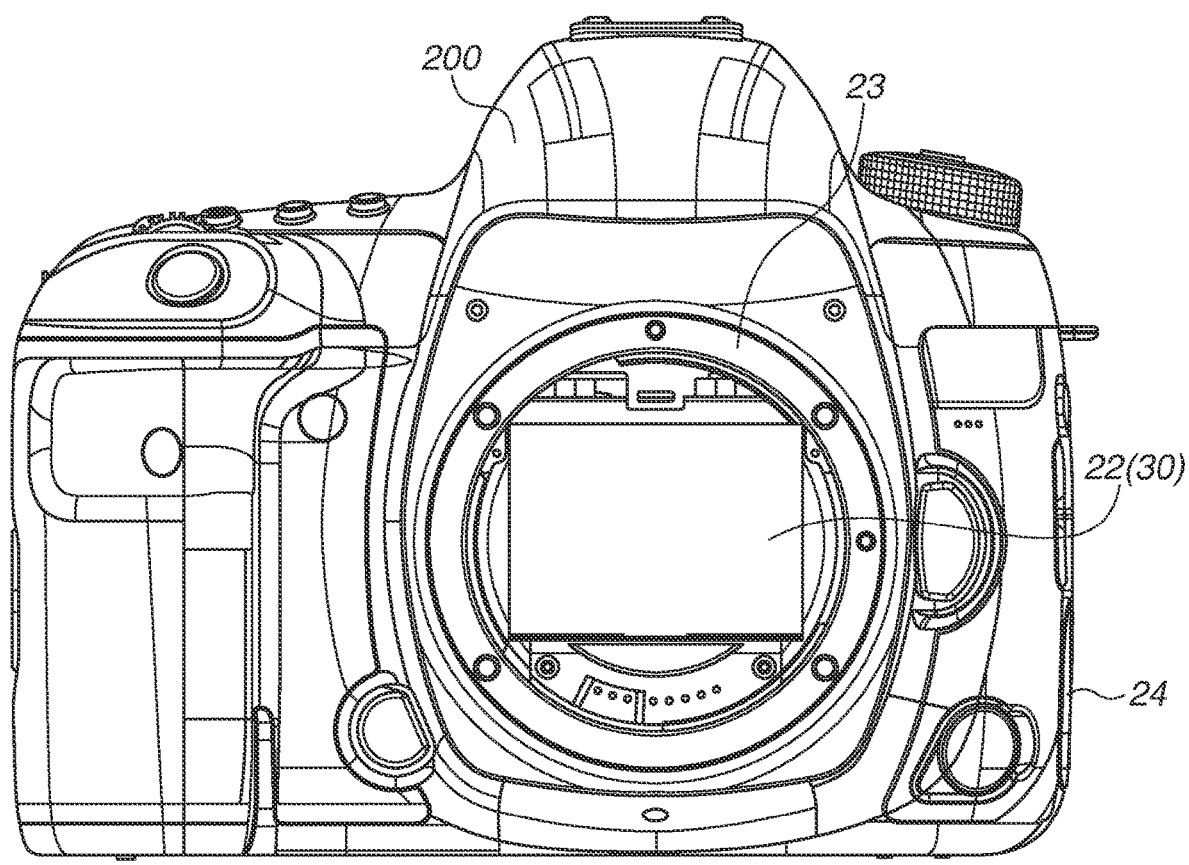
FIG. 2 is a front view illustrating an image capturing apparatus according to the exemplary embodiment.

FIG. 2 is the camera 200 as an example of an apparatus including the image sensor as the detection element to be cleaned. In the present exemplary embodiment, the camera 200 is a lens-interchangeable digital single-lens reflex camera. A camera communication unit 24 includes a connection terminal that conforms to a communication standard and is provided on the inside of the cover. The camera communication unit 24 is connected to the communication unit of the cleaning apparatus 100 using a cable such as a universal serial bus (USB) and thereby performs communication in a state where the camera communication unit 24 is electrically connected to the cleaning apparatus 100. If the external apparatus is a lens, a camera control unit (not illustrated) controls the lens and exchanges various types of information about the lens and the camera 200. An image sensor 22 receives object light on an image sensor surface 30 and converts the received object light into an electrical signal to thereby generate digital image data. In addition to the CMOS sensor used in the present exemplary embodiment, various configurations such as a charge-coupled device (CCD) type image sensor and a charge injection device (CID) type image sensor can also be used. Further, not only a light-receiving element, but also a detection element of any configuration can be a cleaning target of the cleaning apparatus 100, as long as the detection element includes a function of performing detection on a surface of an element, such as a detection element that detects an electromagnetic wave such as an X-ray. The image sensor 22 has a structure in which a cover glass, an infrared (IR) cut filter, a low-pass filter (LPF), and the like are superimposed on a photodiode in a thickness direction of the image sensor 22. The cleaning apparatus 100 cleans the uppermost surface of the image sensor 22.

Next, a configuration in which the cleaning apparatus 100 according to the present exemplary embodiment is connected to the camera 200 serving as the detection apparatus according to the present exemplary embodiment will be described with reference to FIG. 1B and FIG. 2.

The camera 200 is fixed in such a manner that a camera fixing unit 23 is connected to the fixing unit 2 of the cleaning apparatus 100. The control unit 10 can control the camera 200 by communicating with a camera control unit 21 via the communication unit 17 and the camera communication unit 24 which are described below. For example, the cleaning apparatus 100 can determine a camera type and control an image capturing operation such as an operation of moving a mirror and a shutter provided on the camera 200.

Referring to FIG. 1B, the second cleaning member 5 is oriented in the direction of the fixing unit 2. The movable pedestal 6 includes the translation mechanism that enables the movable pedestal 6 to be translated in the vertical direction, so that the second cleaning member 5 passes through the center of the ring of the fixing unit 2 and approaches to the image sensor 22 in a state where the camera 200 is physically connected.

The movable pedestal 6 also includes a rotation mechanism that rotates an attached member. The check unit 3, the first cleaning member 4, and the second cleaning member 5 are arranged at positions of different phases about a rotation axis of the rotation mechanism. This rotation mechanism can rotationally drive the front surface of each of the check unit 3 and the first cleaning member 4 to a position opposed to the fixing unit 2 (i.e., the image sensor surface of the image sensor 22), like the second cleaning member 5. Accordingly, when one of the first cleaning member 4 and the second cleaning member 5 is rotationally driven to the position opposed to the image sensor 22, the translation mechanism brings the one of the check unit 3 and the first cleaning member 4 close to an image sensor surface 30, i.e., a detection surface, compared to the other one of the check unit 3 and the first cleaning member 4, and after cleaning, the translation mechanism causes the one of the check unit 3 and the first cleaning member 4 to retract toward the cleaning apparatus 100.

The rotation mechanism of the movable pedestal 6 is also used for controlling an inclination (controlling an angle) of each cleaning member with respect to the detection surface in a cleaning sequence for each cleaning member to be described below. Specifically, the rotation mechanism of the movable pedestal 6 controls, under the control of the control unit 10, the inclination of an injection port when the first cleaning member 4 blows air toward the detection surface of the image sensor 22 and the inclination of the wiping tool (and a core) when the second cleaning member 5 performs the wiping operation on the detection surface. As described above, the translation mechanism and the rotation mechanism of the movable pedestal 6 enable the control unit 10 to control a distance between the detection surface and each unit, for example, by causing each unit to face, approach, or recede from the fixing unit 2, i.e., the detection surface of the detection element.

The check unit 3 includes an illumination and irradiates an object with illumination light in response to an instruction from the control unit 10. In the present exemplary embodiment, a light-emitting diode (LED) is mounted at a leading end of the check unit 3, and the check unit 3 irradiates the image sensor 22 with light in a state where the image sensor 22 is brought close to the check unit 3. At this time, the check unit 3 captures an image of the element surface (sensor surface) of the image sensor 22, thereby acquiring an image used to check the state of contamination on the surface. In the exemplary embodiment, an image of the sensor surface is acquired using an image capturing function of the image sensor 22. However, the configuration is not limited to this example. The check unit 3 itself may include any sensor, such as an image sensor, so as to acquire information based on which the state of the surface of the detection element can be checked. In the present exemplary embodiment, the check unit 3 is attached to the movable pedestal 6 together with the first cleaning member 4 and the second cleaning member 5. However, for example, the check unit 3 may be fixed to and installed at a position near the fixing unit 2. When the check unit 3 is installed in this manner, the irradiation and image capturing can be also performed during execution of cleaning by each cleaning member. Further, an illumination and/or an image sensor may be provided as the check unit 3 in the vicinity of a cleaning member (an injection port and a wiping tool provided at a leading end of the core) of each of the first cleaning member 4 and the second cleaning member 5.

The first cleaning member 4 is a cleaning instrument that performs non-contact cleaning on a detection element surface. In the present exemplary embodiment, air is blown from a leading end (injection port) of a cylindrical member, thereby blowing off foreign particles adhering to the surface of the approached image sensor 22 by wind pressure in a state where the image sensor 22 has approached the leading end. Further, in the present exemplary embodiment, the first cleaning member 4 includes an ionizer having a static elimination function that is obtained by electrically charging the air so that foreign particles adhering to the surface of the image sensor 22 can be de-charged and easily removed. However, the ionizer need not necessarily be provided because a certain level of effect can be obtained only by blowing air without providing the static elimination function.

The second cleaning member 5 is a cleaning instrument that performs contact cleaning on the detection element surface. In the present exemplary embodiment, foreign particles are cleaned off by directly wiping the surface of the approached image sensor 22 in a state where the image sensor 22 has approached the leading end, using the wiping tool mainly attached to the leading end of the core. Examples of the wiping tool to be used include a microfiber cloth, paper, and tape. The wiping tool is configured to be retractable such that the second cleaning member 5 comes into contact with the cleaning surface and moves to perform the wiping operation and then a new wiping tool comes into contact with the cleaning surface. Further, in the present exemplary embodiment, the second cleaning member 5 is also configured to perform cleaning using a wiping tool dipped in a solvent to remove grease, as needed. The specific configurations of the first cleaning member 4 and the second cleaning member 5 are not particularly limited, as long as the first cleaning member 4 and the second cleaning member 5 are non-contact cleaning equipment and contact cleaning equipment, respectively.

In the present exemplary embodiment, as described above, the movable pedestal 6 includes the translation mechanism that can be translated in an X-axis direction, a Y-axis direction (on a horizontal plane), and a Z-axis direction (on a plane perpendicular to the horizontal plane), and the rotation mechanism for controlling the angle of each cleaning member with respect to the fixing unit 2. However, drive mechanisms for the movable pedestal 6 and each cleaning member are not limited to these mechanisms. For example, as long as the first cleaning member 4 can blow air in a wide range and with a high ejection amount, the first cleaning member 4 may be configured to perform cleaning only by moving along one axial direction on the horizontal plane. In this case, the second cleaning member 5 can be also configured to perform cleaning only by moving along one axial direction, like in the first cleaning member 4, by setting the width (width in a direction perpendicular to a scanning direction) of the wiping tool for performing the wiping operation to be equivalent to one side of the detection element surface which is the cleaning surface. Accordingly, the movable direction in the translation of the movable pedestal 6 may be set in such a manner that at least biaxial driving can be performed in one of the X-axis direction and the Y-axis direction and in the Z-axis direction which is perpendicular to the X-axis direction and the Y-axis direction.

In the present exemplary embodiment, the movable pedestal 6 includes the rotation mechanism for rotating an attached member, and the check unit 3, the first cleaning member 4, and the second cleaning member 5 are arranged at positions of different phases about the rotation axis of the rotation mechanism. However, the method of attaching each of the units to the movable pedestal 6 is not limited to this method. For example, the check unit 3, the first cleaning member 4, and the second cleaning member 5 may be arranged at different positions on an XY plane (on the horizontal plane) and may be configured to perform an operation (irradiation, image capturing, cleaning) toward the fixing unit 2, i.e., upward in the Z-axis direction. In this case, the control unit 10 may control the movable pedestal 6 to control the position of each unit on the XY plane, thereby changing the member to be opposed to the fixing unit 2 and control the movable pedestal 6 in the Z-axis direction (vertical direction) to thereby control each unit to approach (come into contact with) or recede from the detection element surface to be cleaned. With this configuration, a space formed in the Z-axis direction can be reduced as compared with the exemplary embodiment described above, and there is no need to provide the movable pedestal 6 with a rotation mechanism, which leads to a reduction in cost. However, since it becomes difficult to control the angle of each unit with respect to the detection element surface during cleaning, a rotation mechanism may be separately provided in part of each unit.

Figure 3:
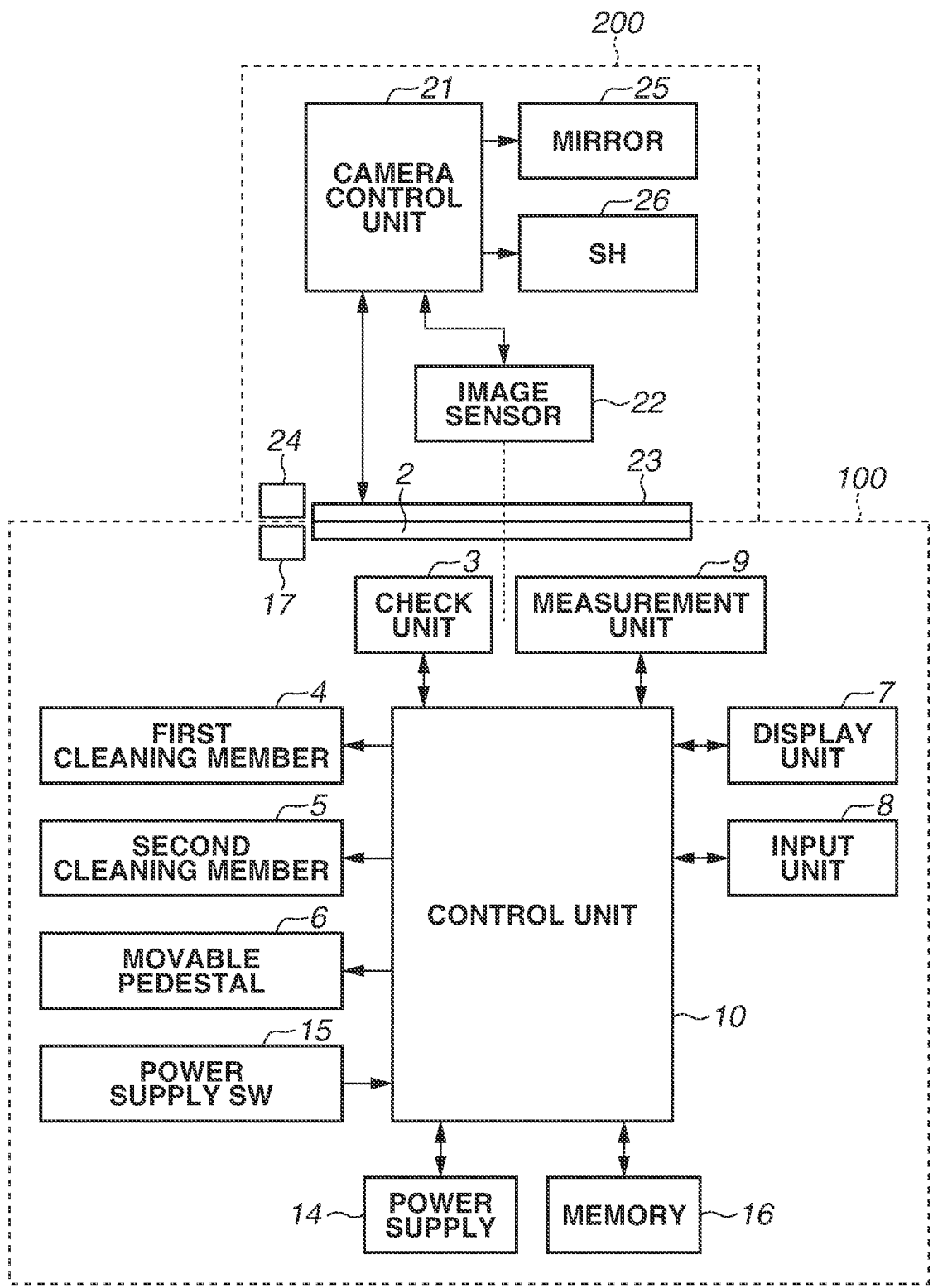
FIG. 3 is a block diagram illustrating a main configuration of each of the cleaning apparatus and the image capturing apparatus according to the exemplary embodiment.

FIG. 3 is a block diagram illustrating a main electrical configuration of each of the cleaning apparatus 100 and the camera 200 according to the present exemplary embodiment.

The cleaning apparatus 100 operates with power supplied from the power supply 14, and ON/OFF of the power supply is switched by a power supply SW 15. The display unit 7 displays various types of information about the cleaning apparatus 100 and the camera 200 and various types of information, such as an operation state, a setting made by a user operation, and a guidance for user operation, in response to an instruction from the control unit 10.

Information about an external apparatus that is stored in a memory 16 or is acquired via the communication unit 17 or another communication path is input to an input unit 8, so that an appropriate operation can be performed according to the camera 200 to be attached. Various types of information about instructions made by user operations are also input to the input unit 8. In the present exemplary embodiment, as the information about the external apparatus, model information and specifications of the camera 200 to be connected are acquired via the input unit 8.

A measurement unit 9 is composed of, for example, a laser distance meter, and measures the position (coordinates, a distance from the image sensor, etc.) and size of the image sensor of the connected camera 200. If the model information about the camera 200 to be attached is determined and the corresponding cleaning program is stored in the memory 16, there is no need to provide the measurement unit 9 to measure the position and size of the image sensor 22. The control unit 10 which is composed of a computer including a CPU incorporated in the main body 1 of the cleaning apparatus 100 controls the overall operation of the cleaning apparatus 100. The control unit 10 processes information from each unit and instructs each unit to execute processing.

The connection terminal provided on the fixing unit 2 detects an electrical connection to connection terminals (eight lower connection terminals in FIG. 2) of the camera fixing unit 23 when the camera fixing unit 23 is attached to the fixing unit 2, and the control unit 10 detects the connection of the camera 200.

The communication unit 17 communicates with the detection apparatus including the detection element. In the present exemplary embodiment, the communication unit 17 is a connection terminal that conforms to USB standards, and is electrically connected to the camera communication unit 24 of the camera 200 using a connection cable. When the connection cable is connected to a terminal of each of the communication unit 17 and the camera communication unit 24 in a state where both the power supplies of the cleaning apparatus 100 and the camera 200 are ON, the cleaning apparatus 100 and the camera 200 are energized and communication is established between the cleaning apparatus 100 and the camera 200. The method for establishing communication between the cleaning apparatus 100 and the camera 200 is not limited to this example. Known communication methods, such as a wired local area network (LAN), a high-definition multimedia interface (HDMI®)), and a wireless LAN (Wi-Fi®), Bluetooth®, Bluetooth® Low Energy) can also be applied.

Next, a configuration example of the camera 200 to be detachably connected to the cleaning apparatus 100 will be described. The camera control unit 21 is a microcomputer, and controls the overall operation of the camera 200, such as operation of controlling the image sensor 22, storing captured images, and performing data communication.

The image sensor 22 is arranged at a position that is accessible from an opening formed in the camera mount, and includes a detection surface composed of a photodiode that normally receives a light beam from an object in a state where an image capturing lens is attached. The light beam received by the image sensor 22 is converted into an electrical signal and the electrical signal is output as image data.

A mirror 25 is arranged on an optical axis at a position closer to the object than the image sensor 22 in the camera 200, and reflects or disperses light to be transmitted to the image sensor 22 on a sensor (not illustrated) other than the image sensor 22, an optical viewfinder, or the like. It is necessary to cause the mirror 25 to retract to a certain extent from the optical axis of the image sensor 22 during cleaning of the image sensor 22. In the present exemplary embodiment, using a mechanism for causing the mirror 25 to retract from the optical axis during exposure of the image sensor 22, the camera 200 causes the mirror 25 to retract from the optical axis to such an extent that a member of the cleaning apparatus 100 can approach to the image sensor 22 during cleaning. In the present exemplary embodiment, the camera 200 serving as the detection apparatus is a digital single-lens reflex camera including the mirror 25. However, a mirrorless single-lens camera, which includes neither an optical finder nor a mirror, is also applicable to the present invention.

A shutter (SH) 26 which functions as a light-shielding member is arranged at a position closer to the object than the image sensor 22 in the camera 200, and serves as a shutter that blocks light from being transmitted to the image sensor 22 during image capturing.

Next, each operation sequence for the cleaning apparatus 100 will be described with reference to FIGS. 4A, 4B, and 4C.

FIG. 4A is a flowchart illustrating a check sequence for checking a state (dirt state, cleaning state) of the detection element surface to be cleaned by using the check unit 3. In the entire cleaning sequence to be performed by the cleaning apparatus 100, the control unit 10 performs each operation in the processing flow, or instructs each unit to execute each operation, as needed. In the cleaning apparatus 100, when the check sequence is started, the camera 200 is already fixed to the cleaning apparatus 100 by the camera fixing unit 23 and the fixing unit 2, and the communication unit 17 establishes communication with to communicate with the camera 200 via the camera communication unit 24 and a USB connection cable.

In step S100, the control unit 10 first controls the movable pedestal 6 to orient the check unit 3 toward the fixing unit 2, controls the check unit 3 to move through the fixing unit 2 and the camera fixing unit 23, and controls a leading end of the check unit 3 to be close to the image sensor 22. In step S101, in the vicinity of the image sensor 22, the check unit 3 irradiates the image sensor 22 with light by light emitted by a point light source, such as an LED, which is provided at the leading end of the check unit 3. Although the configuration of the illumination is not limited to a point light source, the point light source is preferable because light is more likely to be uniformly incident on each element and the state of the detection surface can be measured under substantially the same conditions.

In a state where the above-described illumination is irradiated, the control unit 10 sends a signal to the camera control unit 21 via the communication unit 17 and the camera communication unit 24. In step S102, the control unit 10 causes the image sensor 22 to perform the image capturing operation. In step S103, the control unit 10 acquires the captured image. In step S104, the acquired image is recorded on the memory 16 via the communication unit 17 and is converted into an image for display, and then the image is displayed on the display unit 7. In this case, the control unit 10 detects, from the image captured and recorded, the state of the image sensor surface and information about foreign particles or dirt, for example, by a known image analysis method, such as singularity detection, and displays the detected state and information, together with the image, on the display unit 7. In the present exemplary embodiment, based on these pieces of information, checking of an initial state of the image capturing surface, cleaning completion determination after cleaning, comparison and presentation before and after cleaning, and the like are performed. According to the present exemplary embodiment, in the cleaning sequence after any cleaning operation, the comparison and presentation before and after cleaning are performed on the display unit 7 as the checking result, thereby making it possible to notify the user of the cleaning effect and information about remaining foreign particles. After image recording, in step S105, the check unit 3 retracts toward the cleaning apparatus 100 from the position near the image sensor 22, and then the check sequence is ended.

FIG. 4B is a flowchart illustrating a first cleaning sequence for cleaning the detection element surface by a non-contact cleaning method using the first cleaning member 4. In the entire cleaning sequence to be performed by the cleaning apparatus 100, the control unit 10 performs each operation in the processing flow, or instructs each unit to execute each operation, as needed. When the first cleaning sequence is started in the cleaning apparatus 100, the camera 200 is already fixed by the camera fixing unit 23 and the fixing unit 2, and the communication unit 17 establishes communication with the camera 200 via the camera communication unit 24 a USB connection cable.

In step S110, the control unit 10 first controls the movable pedestal 6 to orient the first cleaning member 4 toward the fixing unit 2, controls the first cleaning member 4 to move through the fixing unit 2 and the camera fixing unit 23, and controls a portion (leading end) of the first cleaning member 4 that is used for cleaning to be close to the image sensor 22. After that, in step S111, the first cleaning member 4 blows air from an injection port formed at the leading end thereof in the vicinity of the image sensor 22.

In this manner, the first cleaning member 4 can remove relatively large foreign particles, such as solid foreign particles or dust, which are adhere to the image sensor surface 30 of the image sensor 22 by the blown air. In this case, for example, if cleaning is performed by wiping the image sensor surface 30 in the same manner as that the second cleaning member 5 normally performs cleaning in a state where large solid foreign particles adhere to the image sensor surface 30, the foreign particles may damage the surface during the wiping operation. In contrast, in the method of removing foreign particles in a non-contact manner, like the first cleaning member 4, foreign particles are not rubbed on the image sensor surface 30 by the wiping operation, which is advantageous in preventing damage to the surface.

In addition, according to the present exemplary embodiment, the control unit 10 controls the movable pedestal 6 so as to prevent the first cleaning member 4 from contacting the image sensor surface 30 of the image sensor 22 through the first cleaning sequence, thereby enabling to further reduce the possibility of damaging the image sensor surface 30 of the image sensor 22. After air is blown, in step S112, the first cleaning member 4 retracts from a location near the image sensor 22, and then the first cleaning sequence is ended.

FIG. 4C is a flowchart illustrating a second cleaning sequence for performing contact cleaning on the detection element surface by the second cleaning member 5. In the entire cleaning sequence to be performed by the cleaning apparatus 100, the control unit 10 performs each operation in the processing flow, or instructs each unit to execute each operation, as needed. When the second cleaning sequence is started in the cleaning apparatus 100, the camera 200 is already fixed by the camera fixing unit 23 and the fixing unit 2, and the communication unit 17 establishes communication with the camera 200 via the camera communication unit 24 and a USB connection cable.

In step S120, the control unit 10 first controls the movable pedestal 6 to orient the second cleaning member 5 toward the fixing unit 2, controls the second cleaning member 5 to move through the fixing unit 2 and the camera fixing unit 23 and controls a portion (leading end) of the second cleaning member 5 that is used for cleaning to be close to the image sensor 22. In this case, if a solvent is used to remove grease or the like during the wiping operation, the movable pedestal 6 is controlled so that the leading end of the second cleaning member 5 is dipped in the solvent contained in a container that is provided at another rotated position, and then the second cleaning member 5 is oriented toward the fixing unit 2. After that, in step S121, the leading end of the second cleaning member 5 is brought into contact with the image sensor 22 in the vicinity of the image sensor 22, and then the second cleaning member 5 wipes the surface of the image sensor 22 with the wiping tool (cloth, paper, or the like) attached to the leading end thereof. By the above-described procedure, the second cleaning member 5 can remove, from the surface of the image sensor 22, dirt, such as foreign particles and high-viscosity oil adhering to the surface of the image sensor 22. After cleaning, in step S122, the second cleaning member 5 retracts from the position near the image sensor 22, and then the second cleaning sequence is ended.

Figure 5:
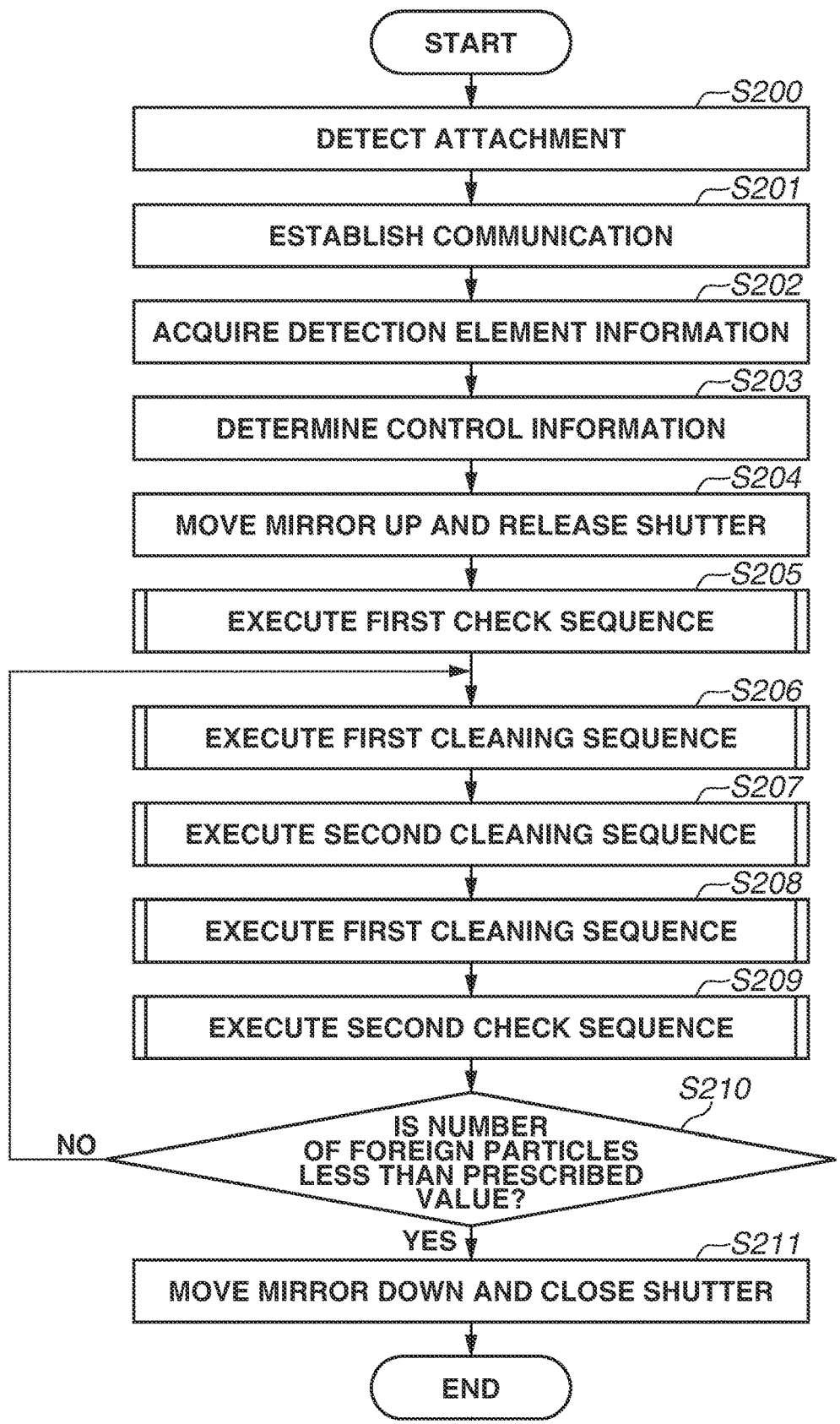
FIG. 5 is a flowchart illustrating a series of cleaning sequences according to the exemplary embodiment.

Next, a processing flow of the entire cleaning sequence according to the present exemplary embodiment will be described with reference to a flowchart illustrated in FIG. 5. This processing flow is started, for example, when the power supply is turned on by operating the power supply SW 15, or when an instruction for stating a cleaning step is received from the input unit 8. The control unit 10 performs each operation in the processing flow, or instructs each unit to execute each operation.

In step S200, by the connection terminal provided on the fixing unit 2, the control unit 10 detects that the camera fixing unit 23 of the camera 200 is attached and fixed to the fixing unit 2. Next, in step S201, the control unit 10 detects that the communication unit 17 and the camera communication unit 24 are electrically connected to each other, and upon detecting the electrical connection, the control unit 10 establishes communication between the cleaning apparatus 100 and the camera 200.

Next, in step S202, the control unit 10 acquires detection element information about the detection element to be cleaned. Examples of the detection element information include information about the position, size, and material of the image sensor 22, and the position of a member that interferes with cleaning of the image sensor 22. These pieces of information may be acquired by the camera 200 through communication, or the detection element information may be read out from a database preliminarily stored in the memory 16 based on camera model information acquired from the camera 200. Alternatively, the detection element information or the model information about the camera 200 may be acquired based on a user input performed in the input unit 8. In the exemplary embodiment in which the check unit 3 is provided with a sensor for detecting the state of the image sensor 22, in step S202, the detection element information is acquired based on, for example, information about an image detected by the check unit 3.

In step S203, the control unit 10 determines control information based on the detection element information about the image sensor 22 obtained in step S202. Specifically, based on the information about the position and size of the image sensor 22, a drive width for moving each of the check unit 3, the first cleaning member 4 and the second cleaning member 5 closer to and away from the detection surface by using the movable pedestal 6 is determined, and the distance from the detection surface is controlled. Further, an injection position or an injection strength of the air injected from the first cleaning member 4, a wiping range of the second cleaning member 5, whether to use a solvent to be applied to the wiping tool, and the like are determined. In this case, according to the present exemplary embodiment, a plurality of cleaning courses using at least one of the first cleaning member 4 and the second cleaning member 5 is prepared, and the user can select a cleaning course from among, for example, a plurality of cleaning course candidates to be displayed on the display unit 7 in consideration of the state of contamination on the detection surface, an operation time, and the like. For example, the following cleaning courses are prepared. In the present exemplary embodiment, the subsequent processing flow will be described assuming that Course 1 is selected. However, if a course other than Course 1 is selected, steps unnecessary for the selected course may be omitted as appropriate (i.e., no operation may be performed in such a step unnecessary for the selected course). Settable courses are not limited to these examples, but instead courses that can be prepared by the user by arbitrarily setting various sequences may be provided. Specifically, the control unit 10 prepares a plurality of patterns of combinations in advance, or receives a manually set combination of cleaning performed by the first cleaning member 4 and cleaning performed by the second cleaning member 5. Based on the received setting, a cleaning order and/or the number of times of the cleaning performed by the first cleaning member 4 and the cleaning performed by the second cleaning member 5 is controlled to clean the detection surface.

Course 1: first check sequence–>first cleaning sequence–>second cleaning sequence–>first cleaning sequence–>second check sequence Course 2: first check sequence–>first cleaning sequence–>second cleaning sequence–>second check sequence Course 3: first check sequence–>second cleaning sequence–>first cleaning sequence–>second check sequence Course 4: first check sequence–>first cleaning sequence–>second check sequence Course 5: first check sequence–>second cleaning sequence–>second check sequence Course 6: first check sequence In step S204, to execute various sequences on the image sensor 22, the control unit 10 transmits a signal to instruct the camera control unit 21 to move the mirror 25 up and release the SH 26. The camera control unit 21 which has received the instruction signal to move the mirror 25 up and release the SH 26 controls the mirror 25 to move up and the SH 26 to be released, and then transmits a signal indicating that the operation is completed to the control unit 10. When the control unit 10 receives the signal, the processing proceeds to the subsequent step. However, in some camera models, such as the mirrorless single-lens camera described above, the image sensor 22 is not shielded, so that cleaning can be performed without carrying out step S204. In this case, step S204 and step S211 to be described below can be omitted.

In step S205, the control unit 10 executes the check sequence illustrated in FIG. 4A as the first check sequence to be performed before cleaning. In step S206, the control unit 10 performs the first cleaning sequence using the first cleaning member 4 as illustrated in FIG. 4B. After the first cleaning sequence is finished, in step S207, the control unit 10 performs the second cleaning sequence using the second cleaning member 5 as illustrated in FIG. 4C. In this case, the first cleaning sequence is carried out before the second cleaning sequence. This is because large foreign particles are removed in advance in the first cleaning sequence so as to prevent large foreign particles, which adhere to the image sensor surface 30, from being rubbed on the surface during the wiping operation performed by the second cleaning member 5 and damaging the surface.

After the second cleaning sequence is finished, in step S208, the control unit 10 performs the first cleaning sequence using the first cleaning member 4 again. The operation in the sequence may be the same as step S206, or may be different from step S206. In this case, the first cleaning sequence is carried out after the second cleaning sequence. This is because fibers of the wiping tool may remain on the image sensor surface 30 during the wiping operation performed by the second cleaning member 5, or foreign particles pushed out of the image sensor surface 30 may remain in the vicinity of the image sensor surface 30. If the first cleaning sequence is carried out after the second cleaning sequence, these foreign particles can be blown off to clean the surface.

After the first cleaning sequence in step S208 is finished, in step S209, the check sequence as illustrated in FIG. 4A is performed as the second check sequence to be performed after cleaning. The second check sequence differs from the first check sequence to be performed before cleaning in that in step S104, images obtained before and after cleaning and the states of contamination, such as the number of foreign particles, before and after cleaning can be displayed on the display unit 7 in a comparable manner. In step S210, it is determined whether the number of foreign particles satisfies a prescribed value, i.e., whether the number of foreign particles is less than a prescribed value, based on information about the image that is obtained after cleaning and acquired in step S209. If the number of foreign particles is not less than the prescribed value (NO in step S210), the processing returns to step S206 to perform cleaning again. In this case, to remove foreign particles remaining even after each cleaning sequence is performed, each cleaning sequence may be re-performed by changing various types of parameters for cleaning. For example, in the first cleaning member 4, the air injection strength can be set higher than before, the degree of charging by the ionizer can be set higher than before, the injection period can be set longer than before, or a movement range can be set wider than before. Further, in the second cleaning member 5, a solvent may be applied to the wiping tool if the solvent is not used in the previous cleaning operation, or a contact pressure on the image sensor surface 30 can be set higher than before.

In step S210, if the number of foreign particles is less than the prescribed value (YES in step S210), the processing proceeds to step S211. In step S211, the control unit 10 transmits a signal to instruct the camera control unit 21 to move the mirror 25 down and close the SH 26. In step S211, the camera control unit 21 which has received the instruction signal to move the mirror 25 down and close the SH 26 controls the mirror 25 to move down and the SH 26 to be closed, and then transmits a signal indicating that the operation is completed to the control unit 10. When the control unit 10 receives the signal, the cleaning sequence is ended.

According to the present exemplary embodiment, the number of foreign particles remaining on the image sensor 22 is detected to check the cleaning state in step S210. However, the exemplary embodiment is not limited thereto. Other analysis results may be used as criteria, as long as the results indicate the state of the image sensor 22 that can be analyzed based on an image. The present exemplary embodiment has been described using an example in which each cleaning sequence is repeatedly performed until the number of foreign particles satisfies the prescribed value. However, there is no need to provide, in particular, the processing flow in which each cleaning sequence is to be repeatedly performed, and the cleaning results, such as the number of foreign particles, may only be displayed on the display unit 7.

Figure 6:
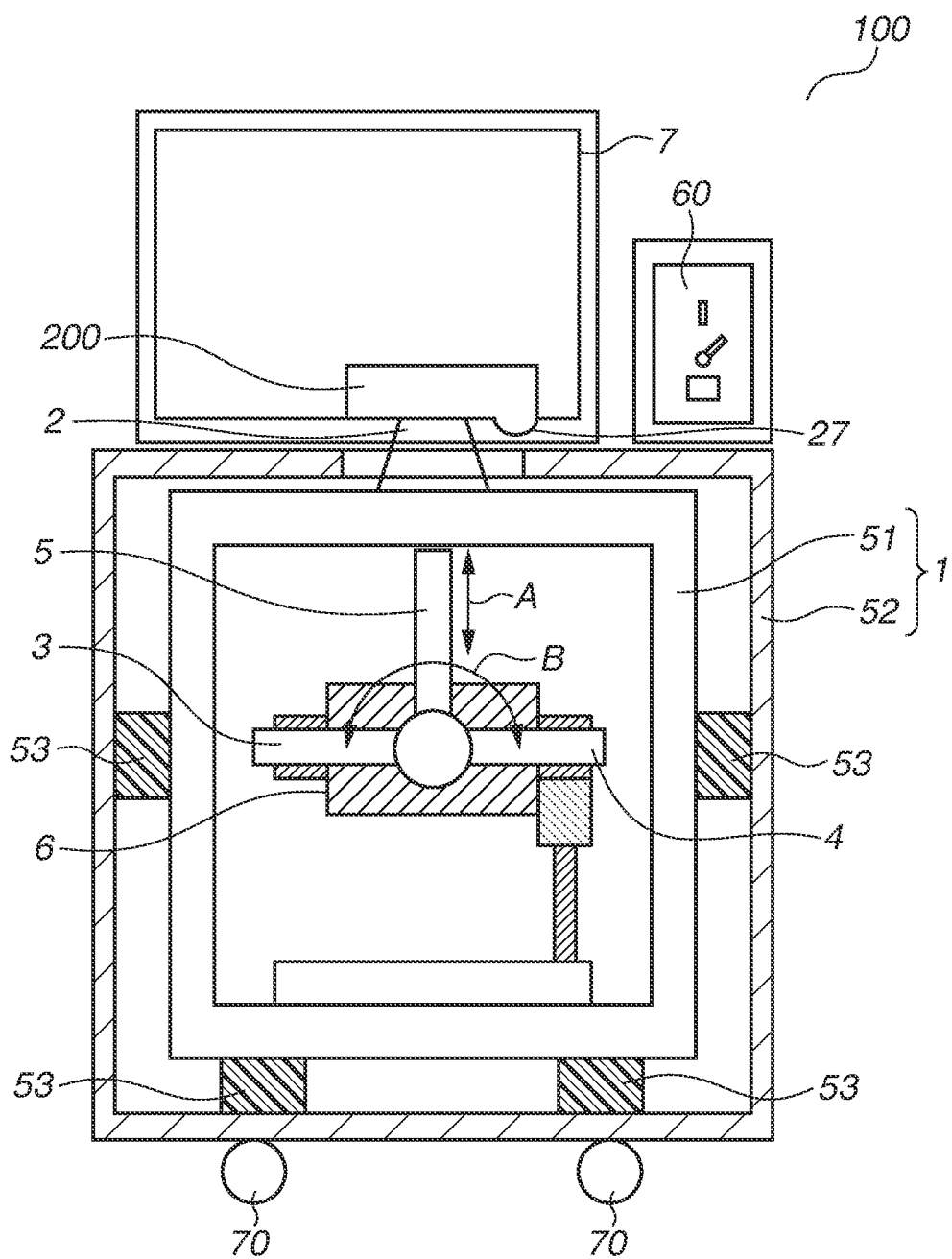
FIG. 6 is a front schematic view illustrating a configuration example of the cleaning apparatus according to the exemplary embodiment.

Next, the configuration of the cleaning apparatus 100 according to the present exemplary embodiment will be described in detail with reference to FIG. 6, FIG. 7, FIGS. 8A to 8D, and FIGS. 9A and 9B. FIG. 6 is a front schematic view illustrating the cleaning apparatus 100 according to the present exemplary embodiment.

The main body 1 includes at least two cases. A first case 51, which is one of the two cases, includes therein the fixing unit 2, the check unit 3, the first cleaning member 4, the second cleaning member 5, and the movable pedestal 6, which are cleaning instruments or members mechanically involved in the cleaning operation of each cleaning instrument in a direct manner. In the present exemplary embodiment, as illustrated in FIG. 1C, the control unit 10 and the air filter 11 are attached to the first case 51 on the rear surface thereof.

The other one of the two cases, i.e., a second case 52, includes components which are not directly involved in the cleaning operation of each cleaning instrument, such as the display unit 7, an account unit 60, and movement assisting portions 70. The second case 52 is connected to the first case 51 via support members 53 and supports the first case 51. The account unit 60 is used for the user to pay charges for usage of services, such as a cleaning service using the cleaning apparatus 100, or receive the change in a case where the cleaning apparatus 100 according to the present exemplary embodiment is installed in a store or the like. The movement assisting portions 70 are wheels for moving the entire cleaning apparatus 100, typically casters, and the movement assisting portions 70 facilitate the movement of the entire cleaning apparatus 100.

The first case 51 is surrounded by the second case 52 and is elastically supported by the second case 52 via the support members 53, which are made of hard vinyl chloride, in the gravity direction and the horizontal direction. Further, the first case 51 is formed of a member and a shape that give a rigidity higher than that of the second case 52. With this configuration, even when the second case 52 receives an external force from outside of the cleaning apparatus 100, the received force is dispersed due to the rigidity of the second case 52 and the elastic force of the support member, so that the first case 51 is less likely to be deformed. Consequently, an advantageous effect of reducing impact on the cleaning operation can be obtained.

Further, the fixing unit 2 illustrated in FIG. 6 is directly supported by the first case 51 and is configured to project from the second case 52. With this configuration, even if the camera 200 is provided with a projecting grip portion, i.e., a grip portion 27, the camera 200 can be connected to the cleaning apparatus 100 without causing any problem. Further, since the camera 200 is directly supported by the first case 51 via the fixing unit 2, even when an external force is applied to, especially, the second case 52 of the cleaning apparatus 100, the external force is less likely to be applied to the components that are directly involved in cleaning, and thus adverse effects of the external force on the cleaning configuration and the cleaning operation can be reduced.

The fixing unit 2 need not necessarily project from the second case 52, and may have any configuration as long as the portion around the fixing unit 2 is formed with a relatively small height to prevent the grip portion 27 from interfering with the attachment of the camera 200 to the fixing unit 2.

Figure 7:
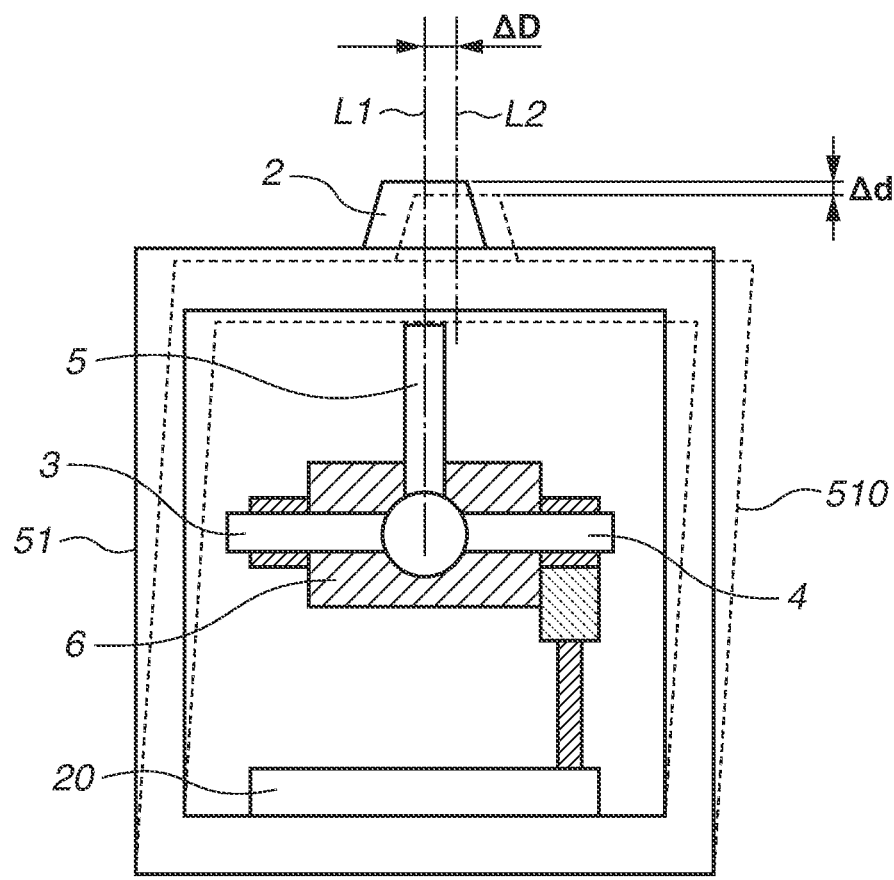
FIG. 7 is a conceptual diagram schematically illustrating a behavior of the cleaning apparatus according to the exemplary embodiment when the cleaning apparatus is deformed due to an external force.

FIG. 7 is a conceptual diagram schematically illustrating a behavior when the main body 1 is deformed due to an external force. It is assumed that the cleaning apparatus 100 according to the present exemplary embodiment is installed at, for example, a service center that provides services for cleaning of the camera 200, or a retail store that sells cameras. The cleaning apparatus 100 is likely to be exposed to vibration and impact when the cleaning apparatus 100 is moved to the installation site. It is also likely that the cleaning apparatus 100 is operated by clients who are not familiar with the cleaning apparatus 100 after the cleaning apparatus 100 is installed at the store. Such a client may casually lean against the cleaning apparatus 100, or put luggage on the cleaning apparatus 100, and thus the cleaning apparatus 100 is also exposed to a static load. FIG. 7 schematically illustrates an example in which a first case 510 is deformed after an external force, such as the above-described impact or load, is applied to the first case 510. L1 represents a central axis of the fixing unit 2 before the first case 510 is deformed, L2 represents a central axis of the fixing unit 2 after the first case 510 is deformed, ΔD represents a displacement amount of the central axis of the fixing unit 2 before and after the first case 510 is deformed, and Δd represents a displacement amount of an attachment surface of the camera 200 before and after the first case 510 is deformed. The displacement amount ΔD, which indicates the amount of a cleaning range to be displaced within the image sensor surface 30, is a major factor causing foreign particles to be not wiped off and left. The displacement amount Δd is a factor that can increase or decrease a contact pressure force of the second cleaning member 5 on the image sensor surface 30. Accordingly, there is a possibility that the image sensor surface 30 may be damaged, or cleaning may be insufficient.

Accordingly, in the present exemplary embodiment, the first case 51 is structured to be elastically supported by the second case 52 via the support members 53, which prevents a vibration, impact, load, or the like caused during movement from being directly transmitted to the first case 51. In the present exemplary embodiment, the support members 53 are made of hard vinyl chloride. However, the material of the support members 53 is not particularly limited, as long as the support members 53 can elastically support the first case 51. For example, hard rubber, metal having a spring characteristic, and the like may also be used. Further, the support members 53 are arranged below the first cleaning member 4 (in the gravity direction) and on the side surfaces of the first cleaning member 4 the horizontal direction), thereby releasing the external force in both of the directions. As for the arrangement of the support members 53, the number of the support members 53 and positions where the support members 53 are placed are not particularly limited. If at least five support members 53 are provided at positions near the four corners and the center on the bottom surface of the first case 51, the first case 51 can be stabilized. Further, if four support members 53 are arranged on the side surfaces of the first case 51, i.e., between the first case 51 and each plate attached to metal chassis (columns) of the second case 52, at positions higher than the central position, the first case 51 can resist a moment due to an external force applied from the position higher than the central position, and thus the first case 51 is more stabilized.

Further, an adjustment mechanism for detecting and correcting the displacement amounts ΔD and Δd may be provided, although the provision of the adjustment mechanism leads to an increase in the size of the cleaning apparatus 100 and an increase in cost.

In the present exemplary embodiment, the image sensor 22 to be cleaned is oriented to the gravitational acceleration direction (downward in the gravity direction) so that each cleaning operation and check operation are carried out from below. Thus, as a first advantageous effect, it is only necessary to provide a space for the check unit 3, the first cleaning member 4, and the second cleaning member 5 to be driven to move in the gravity direction, and the drive control may be performed mainly in the gravity direction (vertical direction). That is, it is possible to prevent an increase in the width of the cleaning apparatus 100 in the horizontal direction, so that an installation area of the cleaning apparatus 100 can be reduced when the cleaning apparatus 100 is installed at a service center or a store. As a second advantageous effect, since the image sensor 22 faces downward in the gravity direction, foreign particles can be easily released from the surface by gravity and the possibility that the removed foreign particles may adhere to the surface again can be reduced. As a third advantageous effect, when the second cleaning member 5 performs cleaning, the leading end of the second cleaning member 5 can be positioned with a higher accuracy. If the insertion direction and the movement direction, when the second cleaning member 5 performs cleaning, are directions perpendicular to the direction indicated by an arrow "A" in FIG. 6, the leading end may be slightly inclined downward due to the weight of the second cleaning member 5 itself. Accordingly, there is a need for using a high-rigidity member, a position correcting unit, or the like for the material of the second cleaning member 5, a position correcting unit, or the like.

Figure 8A:
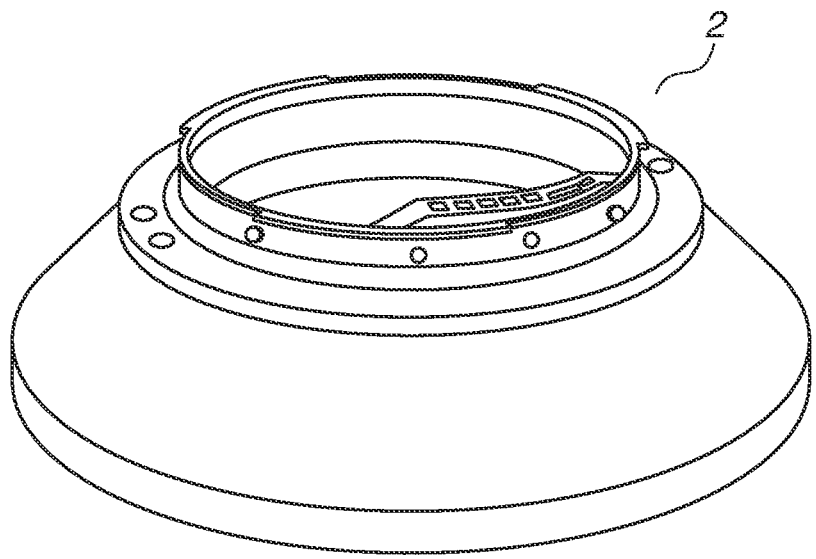
FIGS. 8A, 8B, 8C, and 8D illustrate configuration examples of a fixing unit, a check unit, a first cleaning member, and a second cleaning member, respectively, of the cleaning apparatus according to the exemplary embodiment.

FIGS. 8A to 8D illustrate respective configuration examples of the fixing unit 2, the check unit 3, the first cleaning member 4, and the second cleaning member 5 according to the exemplary embodiment. FIG. 8A is an external perspective view of the fixing unit 2. The fixing unit 2 is provided with a mount portion that is connected to an upper portion of a base, which is formed in a tapered shape or a truncated cone shape, and is configured to be connectable to the camera 200. The mount portion is provided with a connection terminal capable of detecting a connection with the camera 200 and communicating with the camera 200, like an interchangeable lens or the like to be connected to a general camera. In the present exemplary embodiment, an annular illumination member is also provided on the back side of the base, and this illumination member is used to monitor the cleaning state with an output from the image sensor 22 by irradiating the sensor surface with light during cleaning. As described above, the fixing unit 2 may be detachably attached to the first case 51, and may be configured to be replaced with the fixing unit 2 including a mount that is compatible with a camera to be cleaned that is of a different manufacturer or of a different model.

Figure 8B:
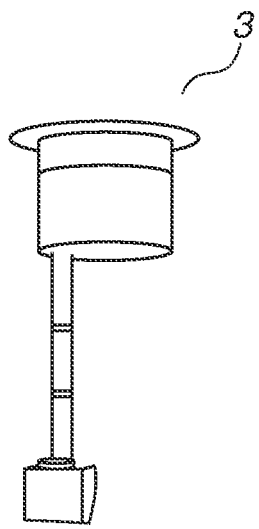

FIG. 8B illustrates a configuration example of the check unit 3. The check unit 3 has a configuration in which a bar-like support member which is fixed to the movable pedestal 6 and includes a wire is provided with a point light source, such as an LED, so that light is irradiated along an extension of the support member.

Figure 8C:
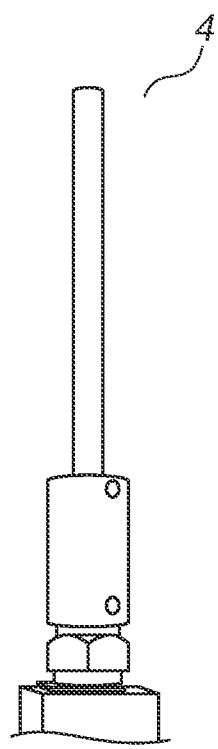

FIG. 8C illustrates a configuration example of the first cleaning member 4. The first cleaning member 4 includes a cylindrical injection port, and blows air from a leading end thereof. As described above, the air is injected into the air filter 11 from an external pump through the intake port 12, and the air is supplied to the first cleaning member 4 through a pipe disposed in the cleaning apparatus 100 in a state where foreign particles or oil are reduced by the air filter 11.

Figure 8D:
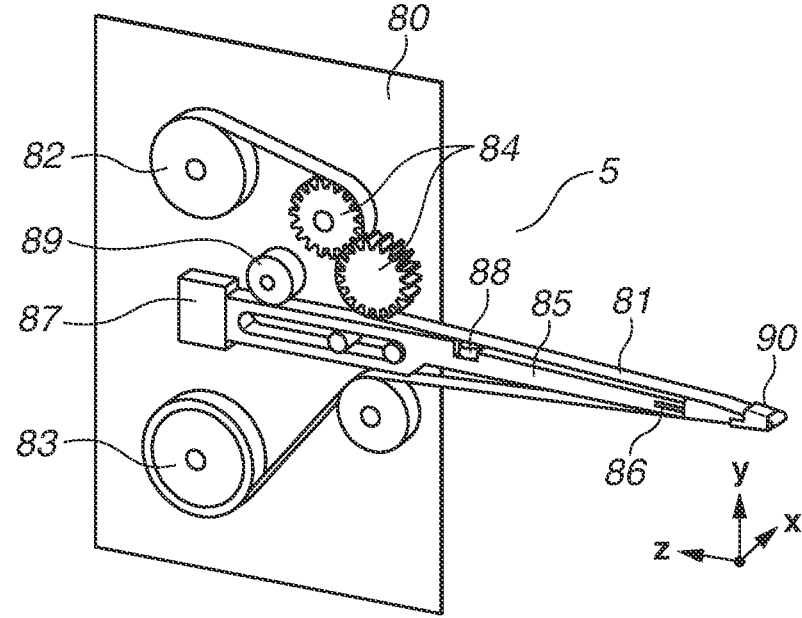

FIG. 8D illustrates a configuration example of the second cleaning member 5. A base plate 80 is provided with a fiber tape 81 which includes woven microfibers to off foreign particles, a winding portion 82 around which the fiber tape 81 is wound, a feed portion 83 for feeding the fiber tape 81, and a gear portion 84 for controlling the amount of winding of the fiber tape 81. A leading end core portion 86 which is formed of metal is attached to a leading end of a core 85, and an elastic member 87 pushes the core 85 in a driving direction. A vibrator 88 applies a vibration to the leading end core portion 86. A roller 89 is a member formed of metal and comes into contact with the core 85 to regulate the driving direction of the core 85. A guide member 90 is a member that regulates the movement of the fiber tape 81 and is molded with resin. The vibrator 88 generates vibrations by a piezoelectric element or an actuator and provides the leading end core portion 86 with micro vibrations in the Z-axis direction during the cleaning operation, thereby making it possible to reduce a frictional force generated between the fiber tape 81 and the image sensor surface 30 and achieve a smooth cleaning operation. Further, frictional forces generated by the fiber tape 81, the guide member 90, and the leading end core portion 86 can also be reduced by the vibrations generated by the vibrator 88, so that a smooth winding operation can be performed during winding of the fiber tape 81.

An operation to be performed during cleaning by the second cleaning member 5 will be described in detail. First, the fiber tape 81 is wound by the gear portion 84 while the fiber tape 81 is caught in the gear portion 84, and a portion of the fiber tape 81 that is not used is drawn from the feed portion 83 and used for cleaning at the leading end core portion 86. A portion of the fiber tape 81 that is already used is wound around the winding portion 82. The movement of the fiber tape 81 is regulated by the guide member 90, and the fiber tape 81 is wound while maintaining the state where the fiber tape 81 is put on the leading end core portion 86. When cleaning is started, the fiber tape 81 that is extended by the leading end core portion 86 is pressed against the image sensor 22 and the operation of wiping off foreign particles is carried out. In this case, the core 85 can slide in the pressing direction (Z-axis direction in FIG. 8D), and cleaning is performed by appropriate pressing while squeezing the elastic member 87. Since an appropriate pressing force is applied to the image sensor surface 30 due to the elastic member 87, foreign particles can be removed without damaging the image sensor 22. Further, the metallic roller 89 is in contact with the core 85 during the cleaning operation, so that the electrical connection between the fixing unit 2 and the core 85 is ensured via the metallic roller 89. During the wiping operation, the vibrator 88 that is attached to an upper portion of the core 85 vibrates the core 85, thereby reducing the frictional force generated between the fiber tape 81 and the image sensor surface 30, which are pressed against each other, and achieving a smooth cleaning operation while preventing the fiber tape 81 from being stuck on the image sensor surface 30.

Figure 9A:
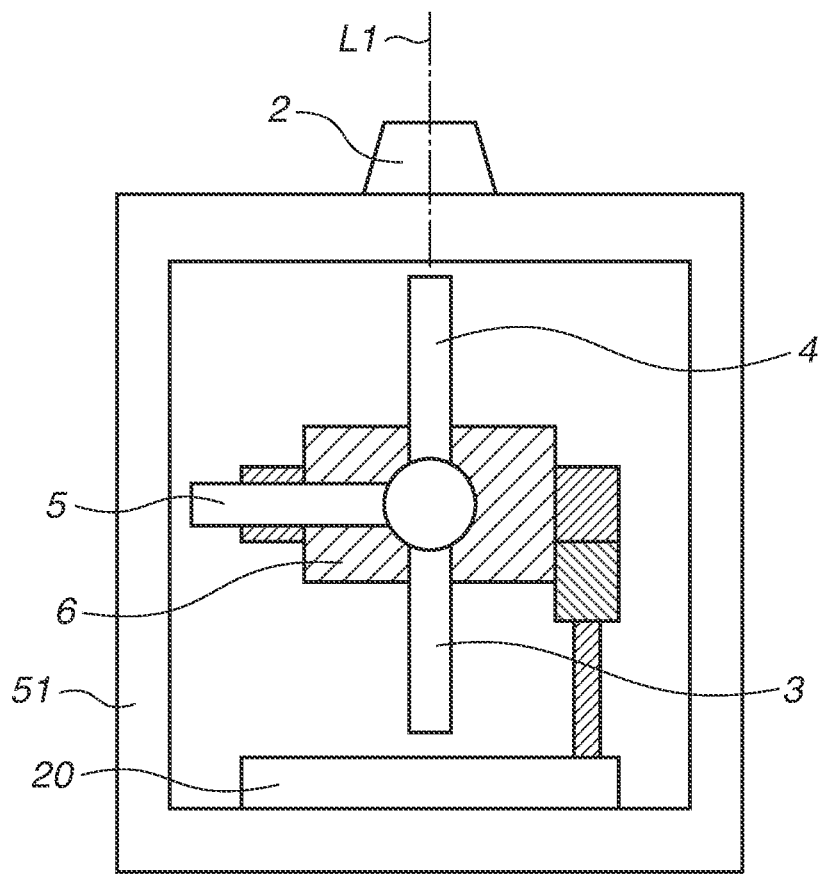
FIGS. 9A and 9B each illustrate a status of the cleaning apparatus according to the present exemplary embodiment when the first cleaning member performs cleaning.
Figure 9B:
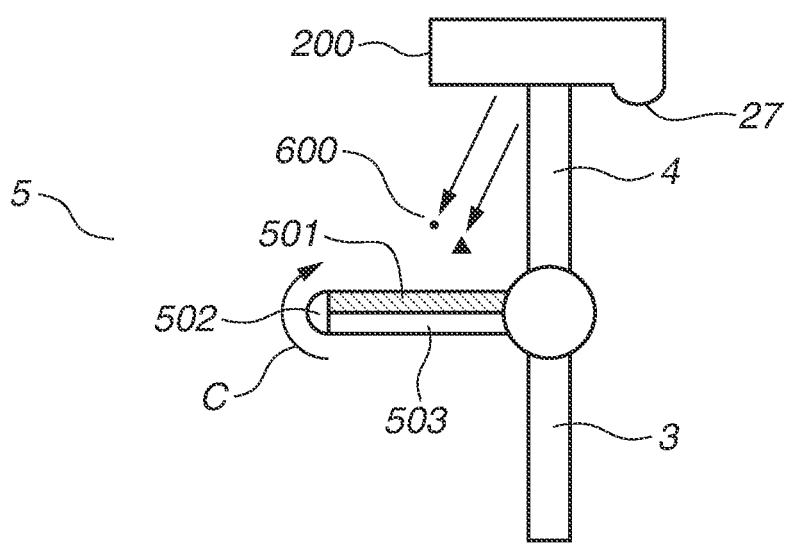

FIGS. 9A and 9B each illustrate a positional relationship among the check unit 3, the first cleaning member 4, and the second cleaning member 5. FIG. 9A illustrates a state where the movable pedestal 6 is rotated counterclockwise by 90 degrees along a direction indicated by an arrow "B" in FIG. 6. In this state, the first cleaning member 4 faces the fixing unit 2, i.e., in the direction of the object to be cleaned. FIG. 9B illustrates a positional relationship among the first cleaning member 4, the second cleaning member 5, and the image sensor 22 in the state illustrated in FIG. 9A. In the present exemplary embodiment, in the case where cleaning is performed on the image sensor 22 by the second cleaning member 5, a retractable system is employed to constantly perform cleaning with clean tape and the tape is wound in a direction indicated by an arrow "C" during cleaning. Accordingly, in the state illustrated in FIG. 9B, an upper portion corresponds to a used tape 501 and a lower portion corresponds to an unused tape 503. With the configurations of the first cleaning member 4 and the second cleaning member 5 and the arrangement thereof, if foreign particles 600 that are blown by the first cleaning member 4 during cleaning fall down, the foreign particles 60 are likely to adhere to the used tape 501, instead of adhering to the unused tape 503, and thus the unused tape 503 can be prevented from being contaminated. Therefore, clean unused tape is always fed when the cleaning operation by the second cleaning member 5 is performed.

As described above, in the present exemplary embodiment, cleaning is performed by the first cleaning member 4 using wind pressure (injection) on the detection surface of the detection element that detects a physical quantity, and thereafter contact cleaning is performed by the second cleaning member 5 while being contact with the detection surface. Thus, various types of foreign particles adhering to the detection surface can be appropriately removed. In addition, the non-contact cleaning is performed again after the wipe cleaning, thereby making it possible to remove fibers of the wiping tool during the wiping operation, foreign particles unremoved by the wiping operation and remaining on the surface, and foreign particles present at the periphery of the detection surface. Further, images of the detection surface are obtained by capturing images of the detection surface before or after cleaning, or before and after cleaning, which makes it possible to check the state of the detection surface before or after cleaning, or before and after cleaning. In this case, the use of the point light source as the light source that irradiates the detection surface with light makes it possible to acquire images that have a deeper depth of field and facilitate the recognition of foreign particles. Therefore, foreign particles remaining on the detection surface can be easily visually observed or detected. In addition, the state of foreign particles can be analyzed by analyzing the captured images of the detection surface, and thus it is possible to present the number of foreign particles and perform display with enhanced visibility for foreign particles.

Furthermore, according to the present exemplary embodiment, the cleaning apparatus includes a plurality of cleaning members capable of performing a plurality of cleaning sequences, and thus can remove various types of foreign particles adhering to the detection surface of the detection apparatus including the detection element.

An exemplary embodiment of the present invention has been described above. However, the present invention is not limited to the exemplary embodiment, and various modifications and changes can be made within the scope of the claimed invention.

According to the exemplary embodiment of the present invention, it is possible to provide a cleaning apparatus capable of removing various types of foreign particles adhering to a detection surface of a detection element, and a control method for the cleaning apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-142901, filed Jul. 30, 2018, and Japanese Patent Application No. 2019-130281, filed Jul. 2, 2019, which are hereby incorporated by reference herein in their entirety.

What is claimed is:

1. A cleaning apparatus that cleans a detection surface of a detection element, the cleaning apparatus comprising:
a first cleaning member including a first cleaning portion configured to perform cleaning, the first cleaning member being configured to clean the detection surface by using the first cleaning portion;
a second cleaning member including a second cleaning portion of a type different from the first cleaning portion, and configured to clean the detection surface by using the second cleaning portion;
a driving device, to which the first cleaning member and the second cleaning member are attached, configured to drive the first cleaning member and the second cleaning member to approach and recede from the detection surface;
a fixing portion that fixes a detection apparatus including the detection element in a mount at an opening of the detection apparatus; and
a control unit configured to control each of the first cleaning member, the second cleaning member, and the driving device,
wherein the control unit is configured to control each of the first cleaning member and the second cleaning member to clean the detection surface by controlling the driving device to cause one of the first cleaning portion and the second cleaning portion to approach the detection surface through the opening relatively to the other one of the first cleaning portion and the second cleaning portion, controlling cleaning of the detection surface to be performed using the one of the first and second cleaning portions that has been caused to approach the detection surface, and controlling the one of the first and second cleaning portions that has been caused to approach the detection surface to recede from the detection surface after the cleaning.

2. The cleaning apparatus according to claim 1, wherein the driving device includes a translation mechanism configured to translate the first cleaning portion and the second cleaning portion in a direction in which the first cleaning portion and the second cleaning portion are caused to approach and recede from the detection surface.

3. The cleaning apparatus according to claim 1, wherein the driving device includes a rotation mechanism configured to control one of the first cleaning portion and the second cleaning portion to be inclined with respect to the detection surface.

4. The cleaning apparatus according to claim 1, wherein the first cleaning portion and the second cleaning portion are arranged in different phases about a rotation axis of a rotation mechanism included in the driving device.

5. The cleaning apparatus according to claim 4, wherein the control unit is configured to control the rotation mechanism to rotationally drive one of the first cleaning portion and the second cleaning portion to a position opposed to the detection surface.

6. The cleaning apparatus according to claim 4, wherein the rotation mechanism is used to control the angle of approach for cleaning by causing one of the first cleaning portion and the second cleaning portion to be inclined with respect to the detection surface during cleaning.

7. The cleaning apparatus according to claim 1, wherein the control unit controls the distance between one of the first cleaning portion and the second cleaning portion and the detection surface by use of a translation mechanism and a rotation mechanism included in the driving device, the translation mechanism being configured to translate the first cleaning portion and the second cleaning portion in a direction in which the first cleaning portion and the second cleaning portion are caused to approach and recede from the detection surface, the rotation mechanism being configured to control one of the first cleaning portion and the second cleaning portion to be inclined with respect to the detection surface.

8. The cleaning apparatus according to claim 7, wherein the control unit controls the distance between one of the first cleaning portion and the second cleaning portion and the detection surface by driving the driving device based on detection element information about the detection element to clean the detection surface.

9. The cleaning apparatus according to claim 1, wherein the first cleaning member includes an injection port, serving as the first cleaning portion, through which air is blown, so as to clean the detection surface by the use of a jet of air.

10. The cleaning apparatus according to claim 1, wherein the second cleaning member includes, as the second cleaning portion, a member including a wiping tool configured to wipe foreign particles from the detection surface in a state where the wiping tool is in contact with the detection surface.

11. The cleaning apparatus according to claim 1, wherein the fixing unit fixes the detection apparatus in such a manner that the detection surface faces in a gravitational downward direction when the detection apparatus is fixed.

12. The cleaning apparatus according to claim 1, further comprising:
a first housing including therein the first cleaning member, the second cleaning member, and the driving device and configured to support the first cleaning member, the second cleaning member, and the driving device; and
a second housing configured to support the first housing on a plurality of surfaces via a plurality of elastic members,
wherein the first housing has a rigidity higher than that of the second housing.

13. The cleaning apparatus according to claim 12, wherein one or more of the plurality of elastic members is positioned between a bottom surface of the first housing and a bottom surface of the second housing, and one or more of the plurality of elastic members is positioned between side surfaces of the first housing and corresponding side surfaces of the second housing at a position further from the bottom surface of the first hosing than a central position of the side surfaces.

14. A control method for a cleaning apparatus that cleans a detection surface of a detection element, the cleaning apparatus including a first cleaning member including a first cleaning portion configured to perform cleaning, the first cleaning member being configured to clean the detection surface by use of the first cleaning portion; a second cleaning member including a second cleaning portion of a type different from the first cleaning portion, the second cleaning member being configured to clean the detection surface by use of the second cleaning portion, a fixing portion that fixes a detection apparatus including the detection element in a mount at an opening of the detection apparatus, and a driving device, to which the first cleaning member and the second cleaning member are attached, configured to drive the first cleaning member and the second cleaning member to approach and recede from the detection surface,
the control method comprising:
controlling the driving device to cause one of the first cleaning member and the second cleaning member to approach the detection surface through the opening relatively to the other one of the first cleaning member and the second cleaning member;
cleaning the detection surface by use of the one of the first cleaning member and the second cleaning member that has been caused to approach the detection surface; and
controlling, after the cleaning of the detection surface, the one of the first cleaning member and the second cleaning member that has been caused to approach the detection surface to recede from the detection surface.

* * * * *